United States Patent [19]
Seddon et al.

[11] Patent Number: 5,218,473
[45] Date of Patent: Jun. 8, 1993

[54] LEAKAGE-CORRECTED LINEAR VARIABLE FILTER

[75] Inventors: Richard I. Seddon; Basil L. Swaby, both of Santa Rosa, Calif.

[73] Assignee: Optical Coating Laboratories, Inc., Santa Rosa, Calif.

[21] Appl. No.: 550,255

[22] Filed: Jul. 6, 1990

[51] Int. Cl.$^5$ .................... G02B 5/20; G02B 5/28
[52] U.S. Cl. .................... 359/589; 359/580; 359/613; 359/614; 359/885
[58] Field of Search ......... 350/311, 313, 316, 276 SL, 350/276 R, 163, 164, 166, 1.6, 1.7; 359/359, 360, 577, 580, 885, 887, 890, 601, 613, 614, 578, 587, 589, 361

[56] References Cited
U.S. PATENT DOCUMENTS

| | | | |
|---|---|---|---|
| 2,708,389 | 5/1955 | Kavanagh | 350/166 |
| 3,442,572 | 5/1969 | Illsley et al. | 350/166 |
| 3,539,824 | 9/1970 | Illsley et al. | 307/455 |
| 4,070,100 | 1/1978 | Akiyoshi | 350/276 R |
| 4,342,821 | 8/1982 | Galves et al. | 350/311 X |
| 4,633,078 | 12/1986 | Ferber | 250/216 |
| 4,772,096 | 9/1988 | Kai et al. | 350/276 SL X |

FOREIGN PATENT DOCUMENTS

0195339 9/1986 European Pat. Off. .
8905465 6/1989 PCT Int'l Appl. .

OTHER PUBLICATIONS

*Patent Abstracts of Japan*, vol. 7, No. 125 (P-200)(1270), May, 1983, citing JP-A-58042002.
*Patent Abstracts of Japan*, vol. 10, No. 74 (P-439)(2131), Mar., 1986, citing JP-A-60213830.

*Primary Examiner*—Bruce Y. Arnold
*Assistant Examiner*—David R. Parsons
*Attorney, Agent, or Firm*—Philip A. Dalton

[57] ABSTRACT

A leak-corrected linearly variable filter comprises optical filter coatings formed on an assembly of one or more optically transmissive substrates. Leaks due to the longitudinal precession of incident light within the substrates are suppressed by forming the filter such that no two surfaces which are reflected at the same wavelength within the range of interest are parallel. Typically, the constituent substrates of the filter are oriented at a slight angle relative to one another and filter coatings having overlapping reflective wavelengths are deposited on different substrates rather than on the two parallel sides of the same substrate. Alternatively, venetian shade structures can be incorporated within the substrates to block longitudinal precession of light.

6 Claims, 5 Drawing Sheets

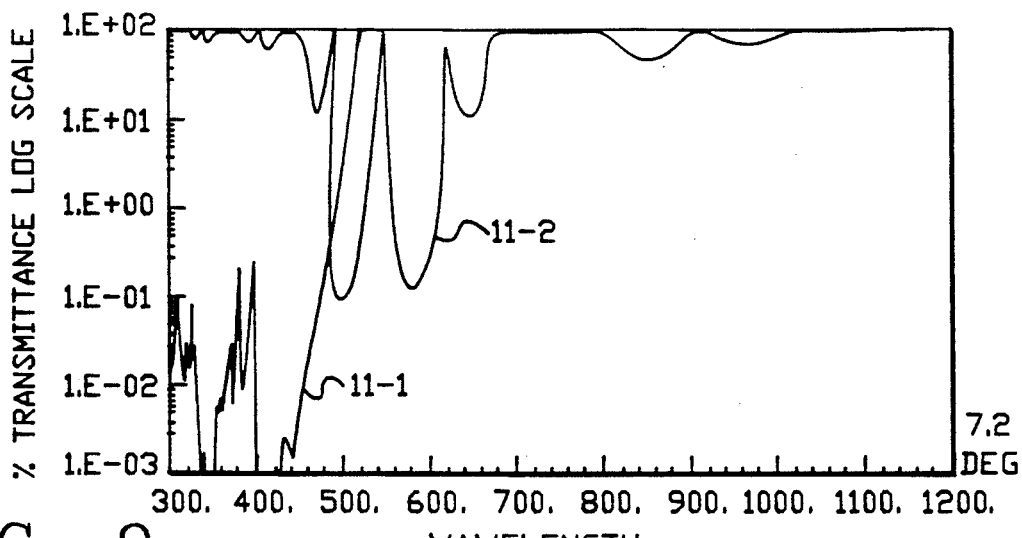
FIG.—9
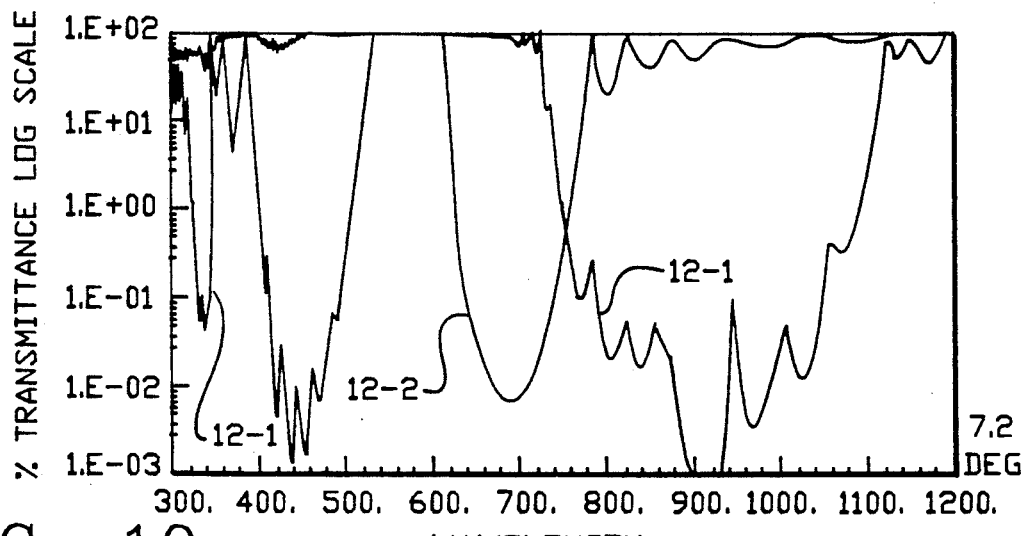
FIG.—10
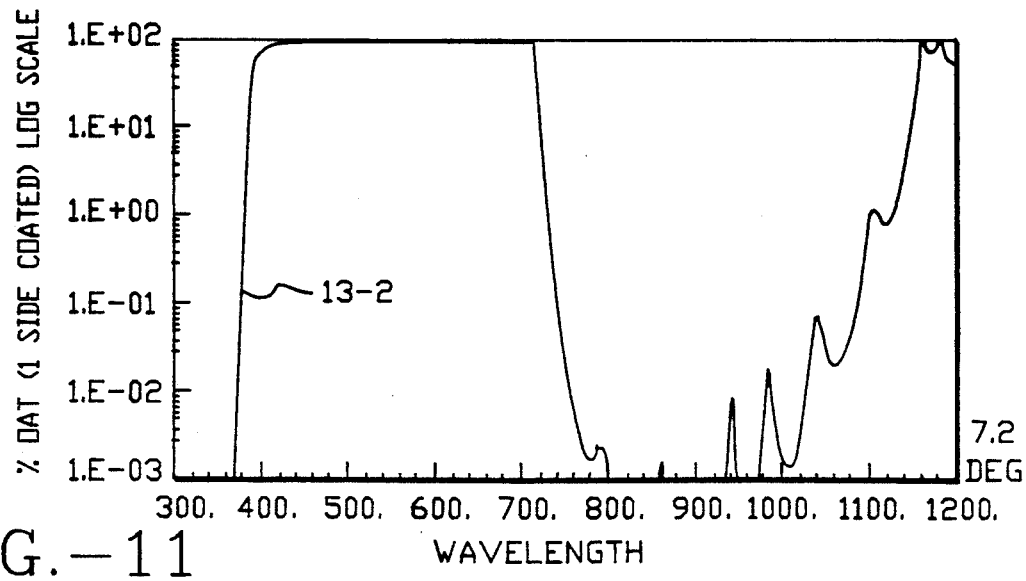
FIG.—11

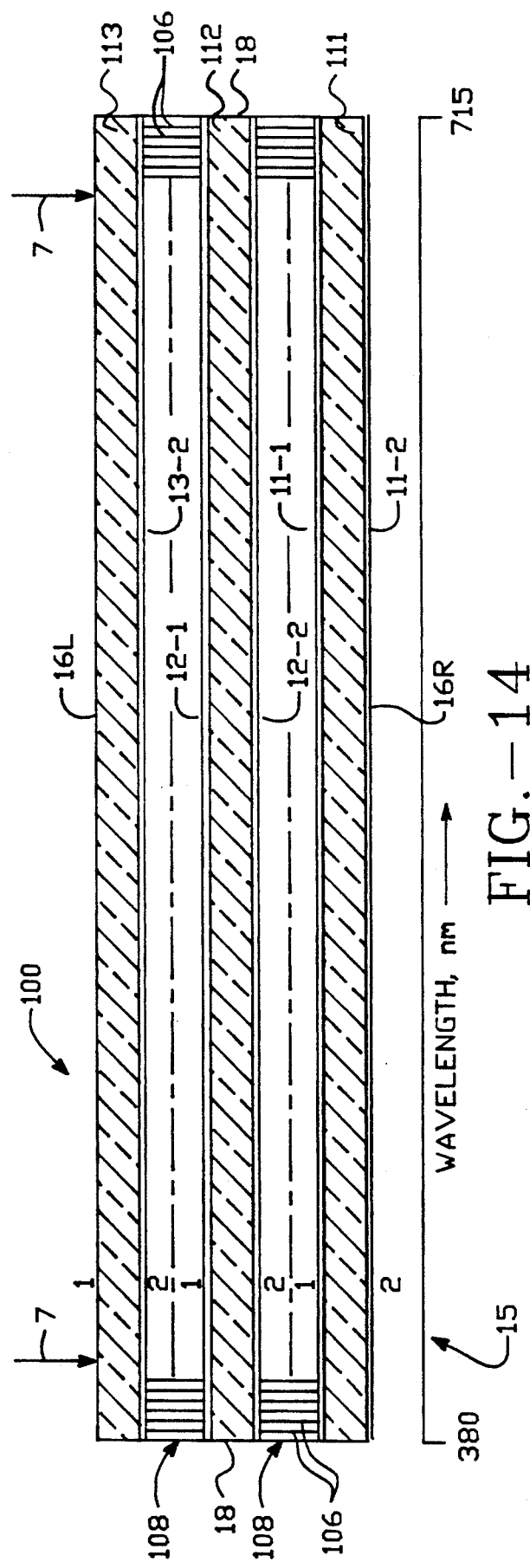
FIG.—14
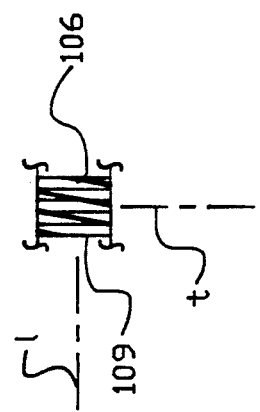
FIG.—15

LEAKAGE-CORRECTED LINEAR VARIABLE FILTER

BACKGROUND OF THE INVENTION

This invention relates to linearly variable filters and, in particular, to multi-layer stack filters which define one or more bandpass filters and block unwanted radiation outside of the pass band as a linear function of length along the filter.

DESCRIPTION OF THE STATE OF THE CONVENTIONAL TECHNOLOGY

Circularly (CVF) and linearly variable filters (LVF) have been produced for a number of years. See, for example, Kavanagh, U.S. Pat. No. 2,708,389, issued May 17, 1955, and commonly assigned Illsley et al, U.S. Pat. No. 3,442,572, issued May 6, 1969 and Illsley et al, U.S. Pat. No. 3,530,824, issued Sep. 29, 1970, relating to variable filters and their method of manufacture. As shown schematically in FIG. 1, CVF filters 1 have been used with a slit or defining aperture 2 to sharply delineate the incident radiation 3 onto a section 4 of the filter and in turn onto a detector 5 or other receiving optics behind the slit.

The circularly and linearly variable filters may use multi-layer dielectric stacks to define a bandpass width and center wavelength, and to block unwanted radiation outside of the pass band. The thickness of the layers and, consequently, the wavelength of the center of the pass band are varied as a function of position along the filter, along the length in the case of linearly variable filters and with angular location in the case of circularly variable filters. Consequently, the wavelength center of the pass band characteristic varies in a controlled manner as the filter is moved over the defining aperture. The relationship between the center wavelength of the bandpass filter and physical length of the LVF usually approximates a straight line.

In order to accommodate the large number of layers required to reject all unwanted radiation by interference techniques, it is usually necessary to distribute the layers over more than one substrate surface. Both sides of a single substrate may be coated, and for many applications a multiple of optically-transmissive substrates are used to accommodate all the layers without sacrificing mechanical integrity.

With the increased availability and affordability of linear detector arrays, it has become very attractive to consider pairing a linear variable filter with a linear detector array of comparable dimensions to produce an integral dispersing element and detector capable of receiving and discriminating a number of wavelengths of radiation simultaneously. FIG. 2 schematically depicts such an LVF filter system. Here, incident light 7 floods the linear filter 6 without scanning and is detected by an associated linear detector 8, which may be a CCD (charge coupled device) array or other suitable device.

Unfortunately, it has been demonstrated that the traditional designs for multi-layer interference filters may not work in this combination if more than one surface is coated. Specifically, if a multi-layer filter has its layers distributed over at least two surfaces and if the individual surfaces have different reflection/transmission characteristics as a function of wavelength, and if these characteristics also vary as a position of physical location on the surface, light of certain wavelengths may leak unexpectedly through the filter.

Consider briefly now the example of a specific wedge filter which is discussed in depth in the Detailed Description. The exemplary linear wedge filter has a filter location at a center wavelength of 546 nanometer (nm). If incident light of 546 nm wavelength is angled slightly towards the filter rather than being normally incident at the corresponding 546 nm location, it may be displaced longitudinally, along the filter before being transmitted through the filter, and detected at a location spaced from the correct, 546 nm location. That is, due to longitudinal precession or leakage, the angled incident light may be detected at a detector location which would not be expected to see 546 nm light.

SUMMARY OF THE INVENTION

Objects

In view of the above discussion, it is a primary object of the present invention to provide an improvement of the linearly variable filter of the type depicted in FIG. 2, i.e., one which is leak-corrected.

It is a related object to provide such a filter whereby the construction which corrects or suppresses such leaks does not substantially decrease the optical efficiency of the filter.

SUMMARY

In one aspect, a linearly variable filter made according to my present invention which satisfies the above and other objects is an improvement of the above-described linearly variable filter and comprises: at least a plurality of optically-transmissive substrates having optical thin film filter coatings formed thereon for providing predictable transmission of light of increasing wavelength according to longitudinal position along the filter, so the operational characteristics of the filter for a given wavelength of incident light correspond to a given position along the filter; and wherein the substrates are adapted for controlling longitudinal precession of light along the filter, to prevent transmission of light of selected wavelength at non-corresponding longitudinal positions along the substrate.

In a related aspect, the filter is constructed such that two surfaces which are reflective at the same wavelength within a selected range are non-parallel. Preferably, the constituent substrates are oriented at non-parallel angles relative to one another. Also, filter coatings having overlapping reflecting wavelengths are formed on different substrates, rather than parallel opposite sides of the same substrate.

In a specific aspect, the adaptation or leak-corrected construction involves orienting the substrates at a non-parallel angle with respect to one another, the angle being defined by increasing the between-substrate separation in the direction perpendicular to that of increasing wavelength along the substrate, i.e., by a relatively close spacing on one side of the filter and a relatively greater spacing at the other side of the filter, for directing internally-reflected light to the side rather than the and of the filter.

In still another, specific aspect, the adaptation which effects the leak-correction construction is one in which (1) the individual substrates are oriented at a non-parallel angle relative to one another and (2) the opposite parallel sides of the individual substrates have filter coatings at only non-overlapping positions on opposite sides thereof.

Preferably, the substrates are oriented at an angle of about 10°.

In another aspect, the adaptation or leak-proof construction comprises a generally planar array of closely-spaced light-blocking elements internal to the filter. The planar array is oriented (positioned) so that the plane defined by the array of elements is approximately parallel to the plane of the filter with the individual elements of the array oriented generally parallel to the direction of propagation of light through the filter, for blocking by absorption longitudinal precession of light within the filter. The elements may be oriented at a small angle, e.g., 5°-20°, relative to the axes of the detector elements, to avoid light blockage by an element whose location coincides with that of a detector.

In another, method aspect, my invention relates to a method of correcting leakage of light along a linear variable filter comprising suppressing longitudinal precession of light along the filter. The correction may involve directing internally-reflected light transverse to the length of filter. Alternatively, the correction may involve blocking internally-reflected light from longitudinal precession, by absorption.

BRIEF DESCRIPTION OF THE DRAWINGS

The above and other aspects of the invention are disclosed in detail with respect to the appended drawings, in which:

FIGS. 9-11 depict the transmission curves for the three substrate elements 11, 12, 13 of FIGS. 3 and 5, for a center location corresponding to a bandpass center of 546 nm;

FIG. 14 is a schematic representation of a longitudinal cross-section of an alternative embodiment of my invention, an LVF incorporating shade-type leak suppression; and FIG. 15 illustrates a preferred orientation of the shade elements of FIG. 14.

DETAILED DESCRIPTION OF THE PREFERRED EMBODIMENT(S)

Figure 1:
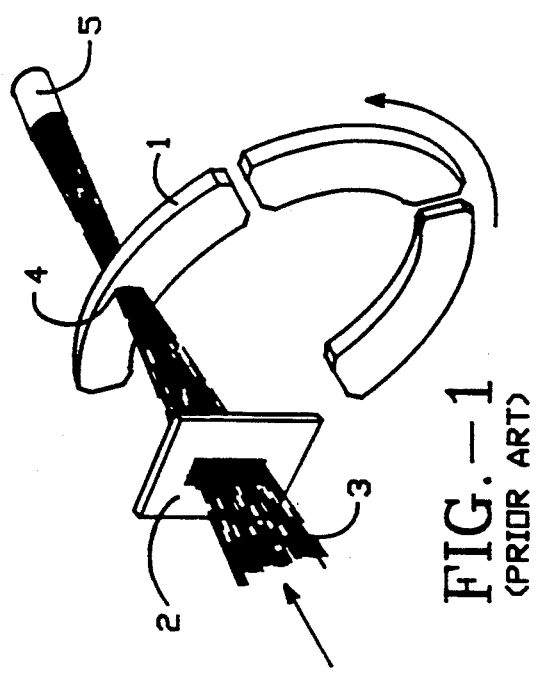
FIGS. 1 and 2 schematically depict the use of circularly variable and linearly variable filters, respectively.
Figure 2:
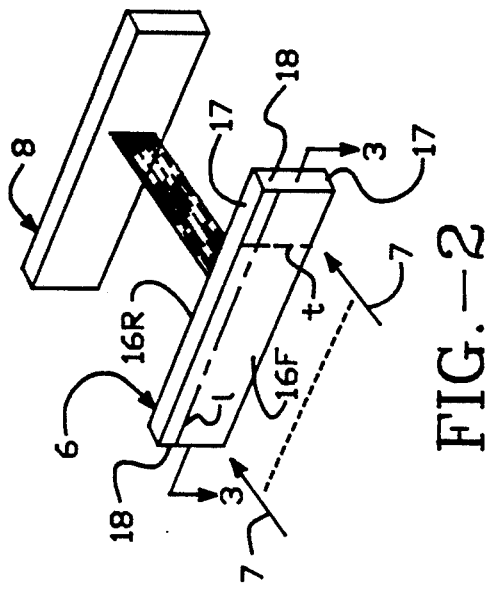
Figure 3:
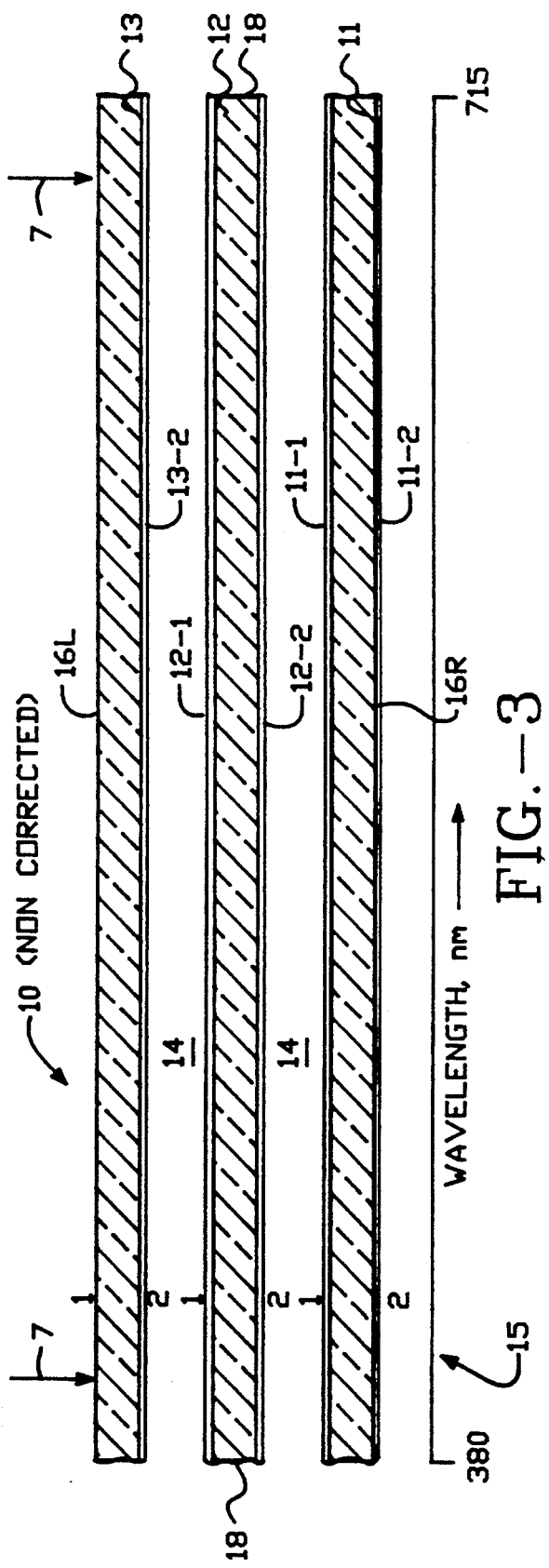
FIG. 3 schematically depicts a longitudinal cross-section view of a non-corrected linearly variable filter.
Figure 4:
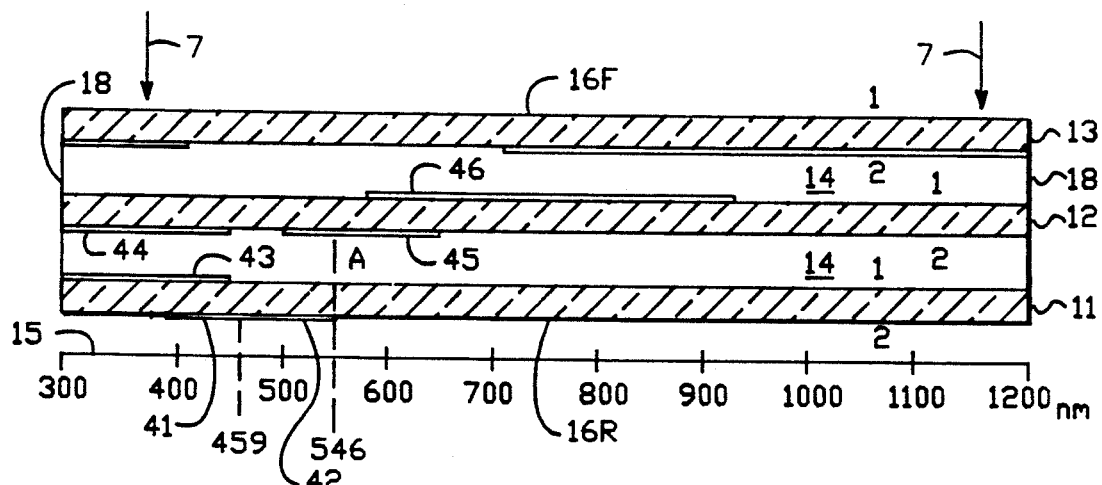
FIGS. 4-8 are schematic representations diagramming the transmission characteristic of the individual coated surfaces of the non-corrected filter at several of the wavelength locations depicted in FIG. 3.

FIG. 3 schematically depicts the construction of a specific type of linear wedge filter 10 which, when formed without benefit of my present invention, suffers from the leakage problem associated generally with multi-layer dielectric stack filters. The illustrated filter 10 is implemented in three spaced-apart substrates 11, 12, 13 typically separated by air interstices 14. For convenient reference, a wavelength scale 15 is depicted along the length of the filter 10. Each of the illustrated substrates has two parallel surfaces designated 1 and 2 (incident light 7 is incident first on surface 1). As illustrated, the substrates 11 and 12 have multi-layer optical filter coatings 11-1, 11-2, 12-1 and 12-2 formed on the opposite sides thereof, whereas the third substrate 13 has multi-layer coating 13-2 on the exit side 2 only. Referring to FIG. 2, for reference purposes, the front (incident) and rear (exit) surfaces or faces of the filter 6 are designated 16F and 16R, respectively; the longitudinal sides or edges are designated 17; and the transverse sides or edges are 18. Also, the longitudinal and transverse axes of the filter are designated 1 and t, respectively, in FIG. 2.

Please note, the coatings 11-1, 11-2, 12-1, 12-2 and 13-2 are continuous coatings typically extending the length of the filter, as shown in FIG. 3. The various "sections" 41, 42, 43, etc., depicted, e.g., in FIGS. 4-8 represent the operational characteristics of the coatings (such as rejection bands) at selected wavelengths and do not represent physically discontinuous coatings.

Referring now to FIGS. 4-8, in a specific embodiment, filter 10 is a linear variable filter comprising a set of linear wedge filters including a narrow band filter and several blocking filters, formed on substrates 11 and 12. In addition, the third substrate 13 contains a third filter element which is not a wedge and which blocks light below 380 nm and above 715 nm. Specifically, element/substrate 11 contains filter coatings on surfaces 11-1 and 11-2 which serve long wavepass filter and bandpass filter functions. Element or substrate 12 has a short wavepass filter coating formed on surfaces 12-1 and 12-2 thereof. Substrate/element 13 contains a UV/IR blocking coating on rear surface 13-2. Collectively, these filter coatings block energy below 380 nm and above 715 nm and create a bandpass filter with center wavelength varying from 380-715 and occurring at locations corresponding to the appropriate wavelength location in FIG. 3.

Figure 5:
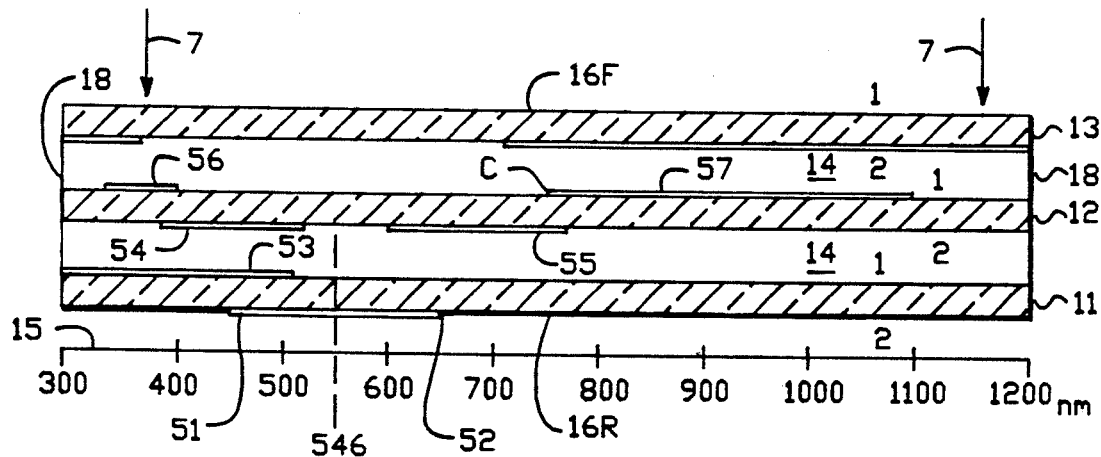

The transmission curves for the individual elements 11, 12, 13 and, specifically, coatings 11-1, 11-2, 12-1, 12-2 and 13-2 are given in FIGS. 9-11, respectively, for a center location corresponding to a bandpass center of 546 nm. FIG. 5 shows the same information in the form of bars 51-55 representing the rejection bands at the fifty percent transmission level. FIGS. 4 and 6-8 give the same information at filter locations corresponding to center wavelengths of 459, 491, 600 and 640 nm, respectively. Specifically, this information for the center wavelengths 459, 491, 546, 600 and 640 nm is given in the form of bars 41-46, FIG. 4; 51-57, FIG. 5; 61-66, FIG. 6; 71-76, FIG. 7; and 81-86, FIG. 8, respectively.

Inherent Leakage Characteristics of Multi-Layer Circularly and Linearly Variable Filters The illustrated filter worked as expected when illuminated with collimated laser light in accordance with the technique depicted schematically in FIG. 2. However, when a converging beam of 546 nm laser light was incident on the filter, detector pixels corresponding to filter bandpass wavelengths of 456 and 640 nm were illuminated as well as at the expected location of 546 nm. In short, as is typical of such filters, light corresponding to the center bandpass wavelength was displaced longitudinally along the filter toward both shorter and longer wavelength locations before completing its transmission through the filter and, thus, provided spurious, leakage signals at locations above and below the expected center wavelength locations.

Analysis of the Mechanism of the Leakage Problem

The above-discussed leakage problem may be stated as follows. If a multi-layer filter has its layers distributed over at least two parallel surfaces and if the individual surfaces have different reflection/transmission characteristics as a function of wavelength, and if these characteristics also vary as a function of physical location on the surfaces, light of certain wavelengths may leak unexpectedly through the film.

If at a specific location for incident light of some specific wavelength, surface 1 is transmissive and surface 2 is reflective, this light will pass through surface 1 and be reflected back from surface 2 to again be transmitted by surface 1 as intended. However, if the light is incident at some angle other than normal to the two surfaces, it may strike surface 2 after reflection at a location different from that at which it entered. For some locations on the filter, this new location at which the light strikes surface 2 may be reflective rather than transmissive, in which case the light will be reflected back and toward surface 1 and may then undergo multiple reflections, traversing or progressing longitudinally within the filter until it reaches a location where either surface 2 or surface 1 is transmissive. If the light escapes through surface 2 at a detector location, this leakage light will be detected at a location where the overall filter is not intended to transmit.

Figure 6:
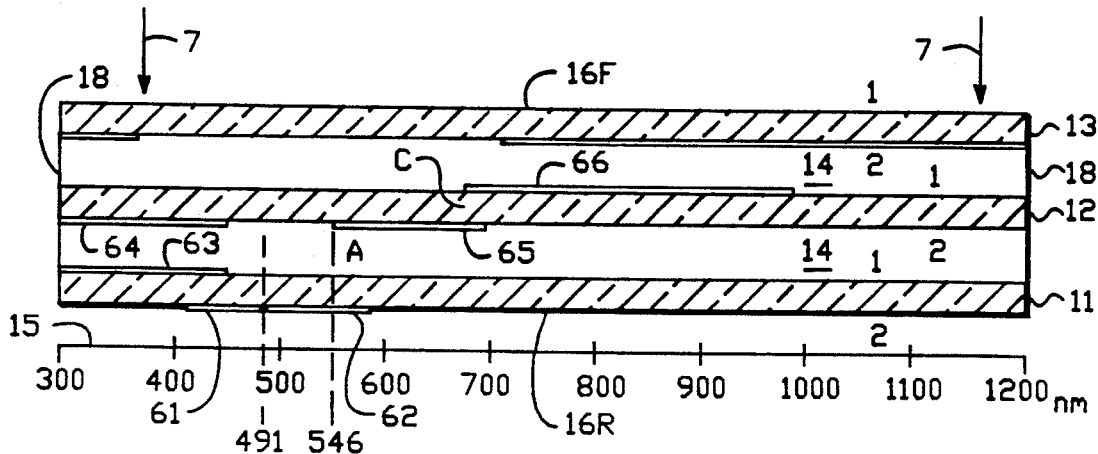

Applying my above analysis to the above-discussed exemplary filter, consider as previously, 546 nm light normally incident between the 546 nm location shown in FIG. 5 and the 491 nm location depicted in FIG. 6, i.e., at a location on the low side of the 546 nm center wavelength. This normally incident light will be transmitted through substrate 12 and reflected by surface 11-2, then retransmitted through substrate 12 to be lost to the system, as intended. The filter acts similarly for 546 nm light normally incident between the 546 center wavelength position and the 640 nm position.

The situation is quite different, however, if the light is angled slightly toward the short wavelength end of the filter rather than being normally incident. In this case, as the light approaches location 491 nm (FIG. 6), it undergoes a first reflection at substrate 11, but because of the associated angle meets substrate 12 at a different location, where it is reflected instead of transmitted. The 546 nm incident light is now trapped between substrates 11 and 12 and bounces back and forth, working its way toward the short wavelength end of the filter. That is, the light precesses longitudinally toward the short wavelength end of the filter. At about location 456 nm, the light is no longer reflected by element 11 and passes through or leaks to the detector pixel at this location and is detected at the location of the 456 nm bandpass filter. This leakage is illustrated at location A on FIGS. 4 and 6.

Figure 7:
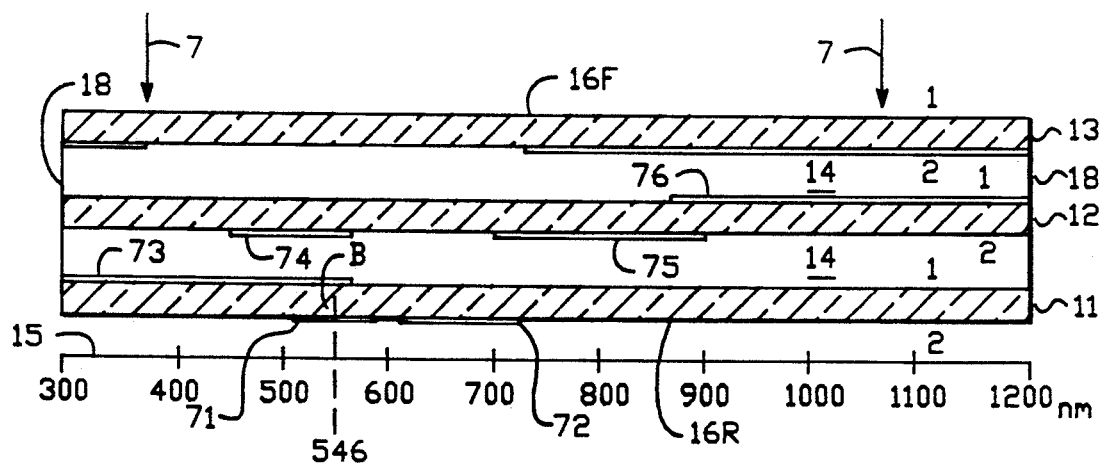
Figure 8:
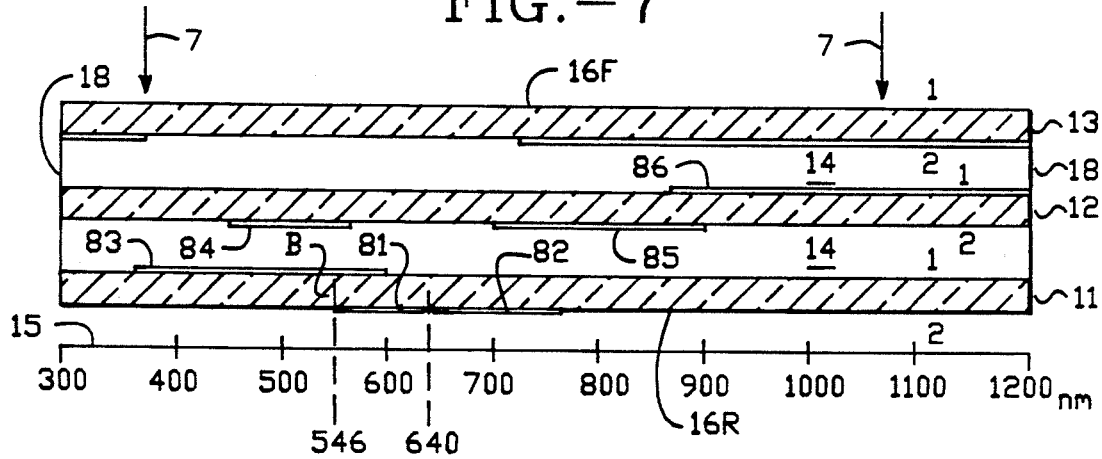

Referring to location B in FIGS. 7 and 8, a similar condition exists toward the long wavelength end of the filter, and the 546 nm energy will escape at the location of the 640 nm bandpass.

The problem of leakage is not unique to 546 nm radiation. Indeed, in general, the same mechanisms will give rise to leaks at locations corresponding to wavelengths approximately sixteen to seventeen percent above and below each nominal wavelength location unless these fall outside the physical dimensions of the array. In addition, there is another location at position C shown in FIGS. 5 and 6 which can cause leaks at locations corresponding to wavelengths thirty-seven percent higher than the illuminating wavelength if this is longer than about 510 nm.

Leak-Corrected Filters

1. Non-Parallel Surface Orientation

In one embodiment, my leak-corrected filter which is the subject of the present invention is designed with the following characteristics. No two surfaces which are reflective at the same wavelength within the range of interest are parallel. Typically, this means that, first, the relevant substrates are angled perpendicular to the array axis so that their coated surfaces make a small angle relative to each other and, second, filters having overlapping reflective wavelengths are formed on different substrates rather than on two parallel sides of the same substrate. Typically, a few degrees deviation from parallelism, e.g., 5°-15°, are sufficient to ensure that light trapped between two coated surfaces will move rapidly transversely toward the edge 17 of the array rather than longitudinally, and will not have a chance to reach a location where an objectional leak may occur.

Figure 12:
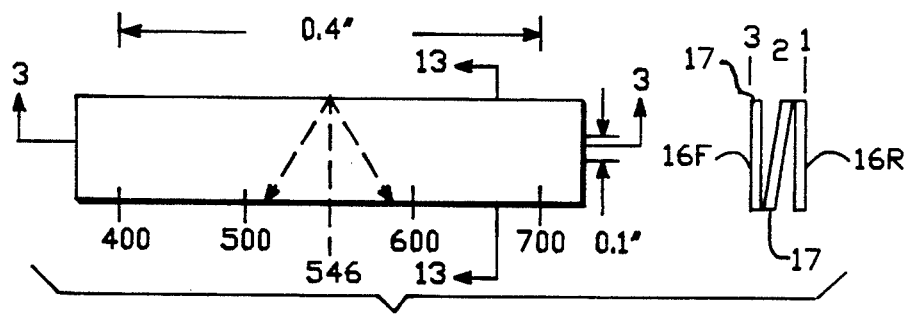
FIG. 12 illustrates geometric optical relationships used in constructing the filter of FIG. 13.
Figure 13:
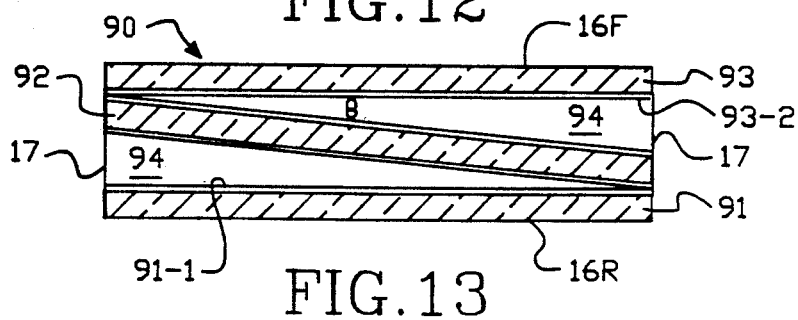
FIG. 13 is a schematic representation of a transverse cross-section of a leak-corrected linearly variable filter, taken along lines 13—13 of FIG. 12.

As mentioned, the exemplary leak-corrected filter discussed here is a modification of the leaky filter 6 described above. As suggested above, the modifications are relatively simple. In the uncorrected filter, the surfaces on opposite sides of substrate 11 at location B in FIGS. 7 and 8 are reflective at the same wavelength within the range of interest. Referring to FIG. 13, in the corrected filter 90, the wide bandpass on side 2 of substrate 12 is replaced with the long wavepass from substrate 11 and a new short wavepass filter which increases the overlap at location C. In addition, former substrate 12 is tilted at an angle along the width, w, of the filter, i.e. (and referring to FIG. 2), in the top-to-bottom direction (or vice versa) transverse to the length, l, of the filter. The resulting substrates are identified as 91, 92, 93 in FIG. 13, replacing the substrates 11, 12, 13 in FIG. 3. Similarly, other components which otherwise correspond to the elements of FIG. 3 are identified by 9X instead of 1X as in FIG. 3. Please note the figures, including FIG. 12, are not to scale.

The physical distance on the filter 90 between the bandpass location and the leak location is shortest at the short-wavelength end of the filter. For a bandpass and illumination wavelength of 400 nm, the location of the leak will be where the bandpass is at 476 nm, and 400-nm energy can enter past element 2 at location 437. The distance the light must travel down the filter is from element 437 to element 476, or 39 nm out of 300 nm where 300 nm corresponds to 0.4 in. The physical distance that light must precess down the filter is (39/300) 0.4=0.052 in. See FIG. 12.

The relationship between longitudinal and lateral precession is quite complex since in the longitudinal direction the elements will be parallel and multiplied reflected light will always be at the incident angle. In the lateral direction, an angle exists between reflecting surfaces and reflected angle can increase rapidly with each bounce. With several bounces, trapped light will move rapidly to the edge of the filter.

It is probably best to tilt substrate 92 at an angle greater than the maximum angle for a ray in the incident energy. Ten degrees is more than sufficient, since to preserve spectral purity incident energy should probably be restricted to less than this value. For a filter 0.1 in. wide, this may be accomplished by using a 0.02 in.

spacer (not shown) on one side and zero on the other for slightly over 10° tilt.

The long-wavelength leak at C (in FIG. 5) is the most likely to be a problem. With the earlier design, this is between two surfaces of substrate 12 and, since these are parallel, multiple reflected rays will retain the same incident angle for lateral as for longitudinal precession. This means that for 40 nm "overlap", incident energy may have to be restricted to a maximum half angle of half the tilt angle. Moving the coating from side 1 of substrate 12 to side 1 of substrate 11 is a solution to this if the amount of material deposited is not unacceptably large.

2. Internal Shade-Containing Filter

A second leak-corrected filter embodiment is identified by the general reference numeral 100 in FIG. 14. The filter 100 incorporates what I term venetian blind or shade structures 108 between the substrates. The blinds 108 comprise a multiplicity of closely-spaced light-absorbing elements 106 each of which is oriented individually perpendicular to the plane of the filter and parallel to the direction 7 of incident light. The plane of each blind structure 108 is generally parallel to the plane of the filter 100 In one specific example, the internal shade structure 108 is fabricated by cutting or forming the Privacy Light Control Screen material available from the Safety and Security Division of 3M Co., which has its U.S. corporate headquarters in St. Paul, Minn., to a thickness of about 0.03 inch. The two thin shade assemblies 108 are positioned one internally between the substrates 111 and 112 and one between substrates 112 and 113.

A presently preferred shade orientation is depicted in FIG. 15, which is an elevation view looking through the filter 100 toward the detector 8, FIG. 2, parallel to the direction of the incident light 7. Preferably the shade elements 106 are oriented at a slight angle of, e.g., 5°-10° relative to the transverse axis, t, of the filter (see FIG. 2), and to the principal axes of the array elements 109, to prevent light blockage (to permit traversal through the filter) when a shade element 106 is positioned directly opposite a detector element 109.

The shade means comprising assemblies 108 enables the transmission of light through the substrates 101-103 in accordance with the optical design of the filter, but absorbs light which traverses longitudinally, thereby preventing the leakage of light without substantially affecting the intended operation or efficiency of the filter. The shades fulfill the function of the angled nonparallel substrates but not the non-overlapping filter coating construction, FIG. 13.

In view of the above discussion of my discovery of the causes of the leakage problem in multi-layer linearly variable filters and the filter design according to the present invention which obviates the leakage problem as well as the specific examples of the implementation of the design solution, those of usual skill in the art will readily adapt my improved leak-corrected filter design to other filter designs in a manner which is within the scope and meaning of the appended claims.

What is claimed is:

1. A leakage-corrected linear variable filter, comprising: first and second optically-transmissive substrates, said first and second substrates being positioned generally parallel to each other; means for providing transmission of incident light of increasing wavelength according to the longitudinal position along the filter, said means comprising optical thin film filter coatings applied to each of said first and second substrates; and means for directing internally-reflected light longitudinally along the filter comprising a third substrate positioned between and nonparallel to said first and second substrates.

2. The filter of claim 1, wherein said third substrate is oriented at an angle of approximately 10 degrees with respect to said first and second substrates.

3. A leakage-corrected linear variable filter, comprising: first and second optically-transmissive substrates, said first and second substrates being positioned generally parallel to each other and each defining an edge of the filter; means for providing transmission of incident light of increasing wavelength according to the longitudinal position along the filter comprising optical thin film filter coatings applied to each of said first and second substrates; and means for blocking longitudinal propagation of light along the filter comprising a generally planar array of closely-spaced interstitial planar light-blocking elements positioned between said first and second substrates, wherein said elements are positioned so that the plane of the array is generally parallel to said first and second substrates and the plane of each element is generally perpendicular to said first and second substrates.

4. The filter of claim 3, wherein the filter has an axis perpendicular to the plane of said first and second substrates and wherein the orientation of the plane of said elements deviates slightly from parallelism to said axis.

5. A leakage-corrected method of operating a linear variable filter, comprising: directing onto the filter light that is to be analyzed; and channeling internally-reflected incident light transverse to the length of the filter.

6. A leakage-corrected method of operating a linear variable filter comprising; directing onto the filter light that is to be analyzed; and absorbing internally-reflected incident light to block the reflected light from longitudinal precession.

* * * * *